United States Patent
Johnson et al.

(10) Patent No.: US 6,711,477 B1
(45) Date of Patent: Mar. 23, 2004

(54) AUTOMATIC FLIGHT ENVELOPE PROTECTION FOR UNINHABITED AIR VEHICLES: METHOD FOR DETERMINING POINT IN FLIGHT ENVELOPE

(75) Inventors: Timothy L. Johnson, Niskayuna, NY (US); Martin E. Kaliski, San Luis Obispo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 26 days.

(21) Appl. No.: 10/230,547

(22) Filed: Aug. 29, 2002

(51) Int. Cl.[7] ................................. G06F 7/00
(52) U.S. Cl. ................. 701/3; 701/7; 701/10; 701/13; 244/75 R
(58) Field of Search ............. 701/3, 7, 10, 13; 340/974, 979; 244/75 R, 76 B, 6, 7 C

(56) References Cited

U.S. PATENT DOCUMENTS 6,493,609 B2 * 12/2002 Johnson ................. 701/3
6,604,706 B1 * 8/2003 Bostan ................... 244/6

OTHER PUBLICATIONS

"Computational Geometry in C", By: Joesph O'Rouke, 2$^{nd}$ Edition, Chapters 1 and 7 (pp. 1–43 and 220–293), Cambridge University Press, 1998.

* cited by examiner

Primary Examiner—Gertrude A. Jeanglaude
(74) Attorney, Agent, or Firm—Scully, Scott, Murphy & Presser

(57) ABSTRACT

A system and method for detecting if a UAV is operating within its flight envelope. The invention includes defining the flight envelope of the UAV. The operating state of the UAV is identified from a present time to a future elapsed time. The invention determines if the UAV will be within its flight envelope at the end of the elapsed time in the future. It can then command the UAV to maintain operation within the flight envelope if the operating state determined is outside the flight envelope.

20 Claims, 3 Drawing Sheets

AUTOMATIC FLIGHT ENVELOPE PROTECTION FOR UNINHABITED AIR VEHICLES: METHOD FOR DETERMINING POINT IN FLIGHT ENVELOPE

CROSS-REFERENCE TO RELATED APPLICATIONS

This application is related to U.S. patent application No. 09/844,863, filed Apr. 27, 2001, now pending. The complete disclosure of that application is hereby incorporated by reference for all purposes.

BACKGROUND OF THE INVENTION

1. Field of Invention

The present invention relates to the field of Uninhabited Air Vehicles (UAVs) and more specifically to a system and method for determining if the UAV is operating within its flight envelope.

2. Description of Related Art

The above-cited prior application disclosed a system and method for Automatic Flight Envelope Protection (AFEP) in a UAV. Generally, the system detected whether an operating command issued by the UAV would cause the UAV to exceed it flight envelope. If so, the AFEP routine would modify the operating command to the extent that operation beyond the flight envelope was preventable.

This system suffered from the drawback that the flight envelope was difficult to represent numerically so that operation beyond the flight envelope could be detected by computer and appropriate corrective action applied. For example, previous methods involved using an "interior blocked" approximation, i.e., using cubes or rectangles to approximate the interior of the flight envelope. These methods were laborious to implement, and are in fact rather poor approximations of the flight envelope. A properly drawn V-N curve usually comes to a cusp at the low velocity limit, and is difficult to capture with a blocked approximation.

Interior blocked approximations also produced many artificial facets, which gives rise to numerous special conditions that must be tested, at the expense of addition computation, even though these limits are quite conservative because interior blocked approximations cannot fit the shape of the flight envelope very well. Thus the algorithm may indicate corrective action before it is actually necessary.

Further, it is normal for the aircraft to spend large portions of flights having the operating point quite close to one or more operating limits. Therefore, an inefficient representation of the flight envelope in the region of such limits will result in unduly constrained behavior of the aircraft.

BRIEF SUMMARY OF THE INVENTION

In order to overcome these and other problems in the prior art, the present invention discloses a system and method for detecting if a UAV is operating within its flight envelope. The invention includes a means or step for defining the flight envelope of the UAV. The operating state of the UAV is identified from a present time to a future elapsed time. The invention determines if the UAV will be within its flight envelope at the end of the elapsed time in the future.

BRIEF DESCRIPTION OF THE DRAWINGS

These and other features, benefits, and advantages of the present invention will be made apparent from the following descriptions, figures, and appended claims, wherein like reference numerals refer to like structures across the several figures.

DETAILED DESCRIPTION OF THE INVENTION

Figure 1:
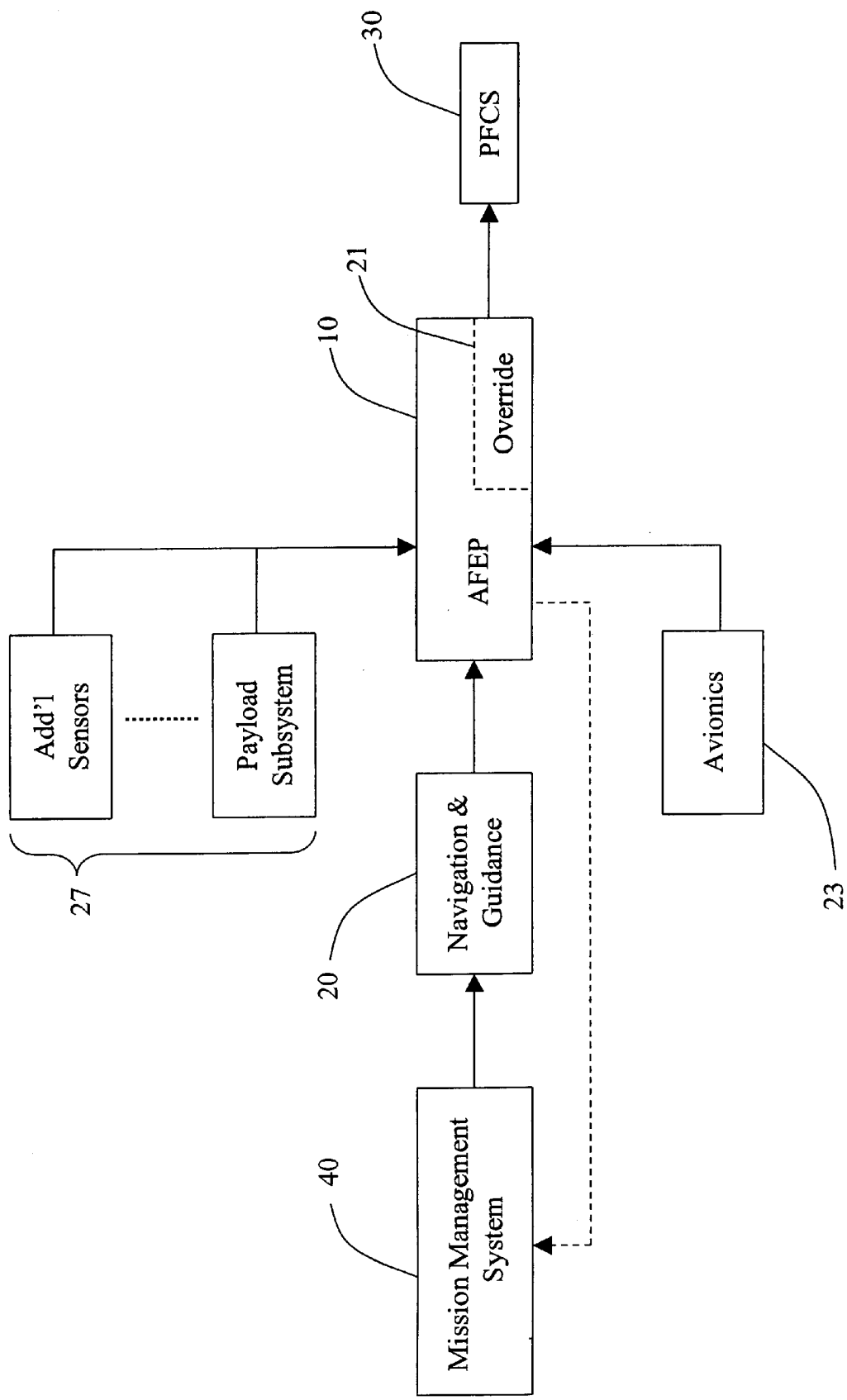
FIG. 1 illustrates a logical representation of UAV Onboard Signal processing.

Referring now to FIG. 1, there is shown a logical representation of UAV Onboard Signal processing, wherein an AFEP unit 10 is logically interposed between a navigation and guidance system 20, and a Primary Flight Control System (PFCS) 30. The AFEP unit 10 receives inputs from a mission management system, 40, from a vehicle avionics subsystem 23, and may receive inputs from additional sensor or payload subsystems 27. The AFEP unit 10 produces outputs to a flight control system 30 or override switch 21 and to the mission management system 40. In varying embodiments, one or more of these subsystems may be merged, may be absent, or may be implemented via a ground data link and pilot-in-the-loop, without affecting the fundamental signal flow depicted in FIG. 1.

Figure 2:
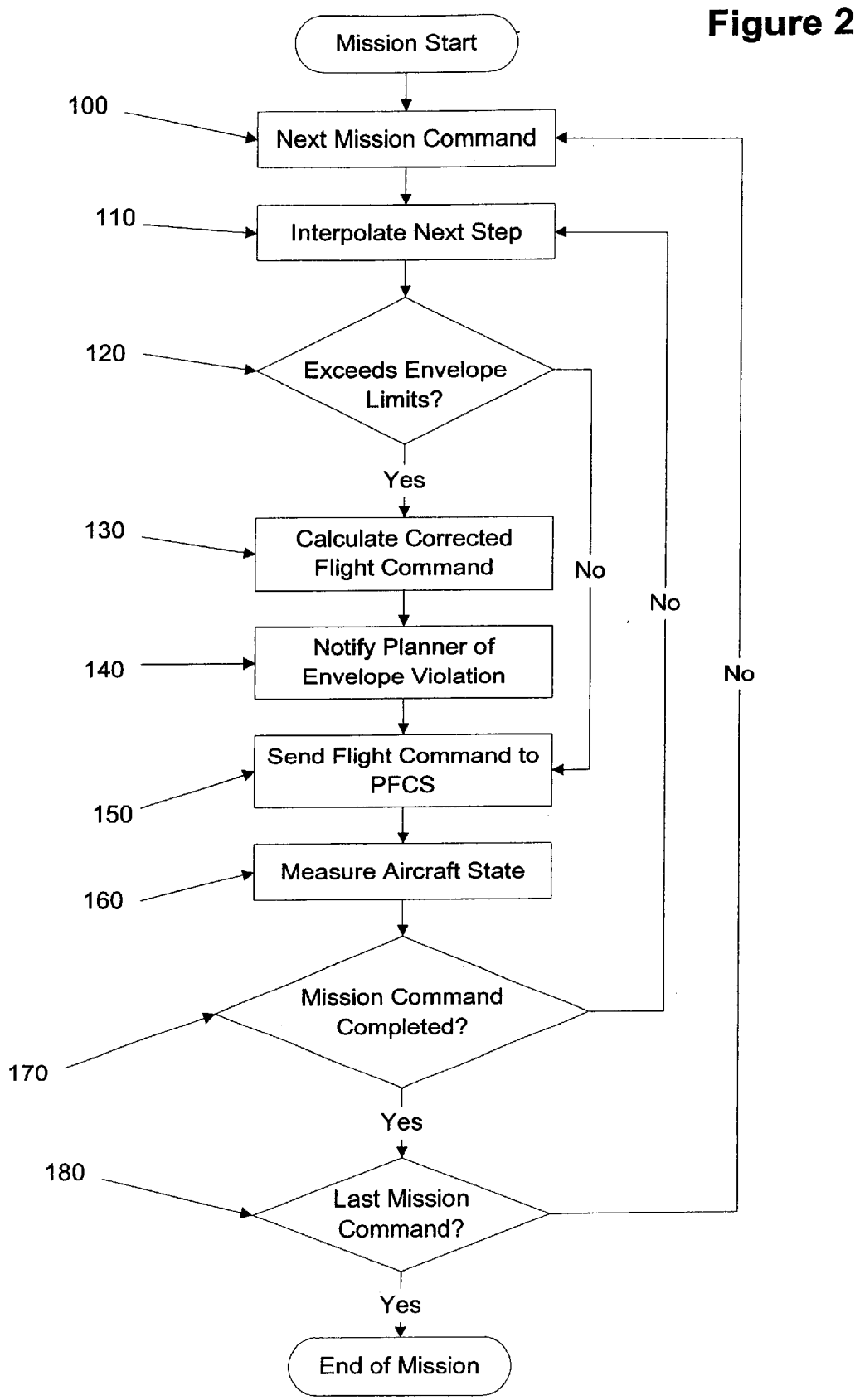
FIG. 2 illustrates a top-level flowchart of the AFEP unit logic.

Referring now to FIG. 2, a top-level flowchart of the AFEP unit 10 logic is shown. At a Next Mission Command step 100, a waypoint or mission command is obtained from the mission management system 40. Without AFEP unit 10, this command (possibly after some preliminary calculations) is fed directly to the navigation and guidance system 20, for execution by the PFCS 30. With AFEP unit 10 in place, this command is pre-evaluated to determine whether it is within the flight envelope of the vehicle, and is overridden through override switch 21 by an achievable command from the AFEP unit 10 if the UAV is determined to not be within the flight envelope. This modification of the data path includes the fact that this system examines one command in advance of the command currently executed.

Normally, a mission level command will require path interpolation between waypoints, performed at Interpolate Next Step 110. Interpolation subdivides the mission plan into intermediate points between waypoints, so that these points may be evaluated by the AFEP unit 10. This is often done partly or completely by the navigation system 20. Alternately, this function can be performed in the AFEP unit 10; if so, then the AFEP unit 10 needs to obtain incremental waypoint outputs from the navigation system 20.

Exceed Envelope Limits 120—The result of the Interpolated Next Step 110 is evaluated to determine whether the UAV operating state exceeds the flight envelope limits. These flight envelope limits may include the consideration of both vehicle and earth-centered coordinates, and generally require dynamic updates based on vehicle avionics 23 inputs to the AFEP unit 10 (as indicated in FIG. 1). If flight envelope limits are exceeded, the AFEP unit 10 is invoked; if not, then the original mission plan is executed (by passing the planned command on to the PFCS 30). The Exceed Envelope Limits 120 test is then re-applied at the next interpolated step of the flight plan. Each mission command can be pre-tested before it is executed. Flight envelope limits may be calculated in advance during the initialization of the mission, or on-line, since the triangulation algorithm, described infra, is fairly simple to execute.

In the Calculate Corrected Command step 130, the originally planned command is modified so that the flight envelope will not be exceeded. In the most typical case of a gradual exceedance of the envelope, the command will be corrected in such a way as to move along the flight envelope in the direction of the original command, as projected onto the surface of the envelope (more complex logic being used when multiple surfaces, such as corners, are approached). In the case of an interruption or discontinuity in the command sequence, a re-plan will be sought and limit protection will be based on recent command history prior to the anomaly. This step calculates corrected commands that achieve short-term envelope avoidance, using the information obtained from the Exceeds Envelope Limits step 120.

In the Notify planner of Envelope Violation step 140, mission planning software, typically executed by Mission Management System 40, is notified of envelope violations, since these may have long term implications for the mission plan. In one embodiment, the invention uses available online (viz., either on-board, or ground station based) replanning methods if these are available. If so, the replanner will compute a modification of the long term mission plan and update the current mission plan. Thus, this step corrects for long term implications of unintended flight envelope penetration, which cannot be resolved without consideration of the entire mission objectives and resource availability. In the event that a replanner is not available, the method continues to seek the best approximation, within the operating envelope capabilities of the aircraft, to the original plan.

The new command (with or without correction) is issued to the PFCS 30 in the Send Command to Flight Control System step 150. In the present case, very short term errors are corrected by the action of the flight control system itself.

In the Measure Aircraft State step 160, the aircraft state is measured to determine that the command is being executed as planned. This step is standard, and is often performed within the control system.

At the Mission Command Completed step 170, the mission command is evaluated vs. the plan to determine whether the plan is being executed correctly. If not, the envelope limiting cycle will be initiated once again.

If the mission command under investigation is complete, a termination condition is applied at the Last Mission Command step 180 to bring the mission to its end.

The Exceeds Envelope Limits Step 120 is now described in greater detail.

Figure 3:
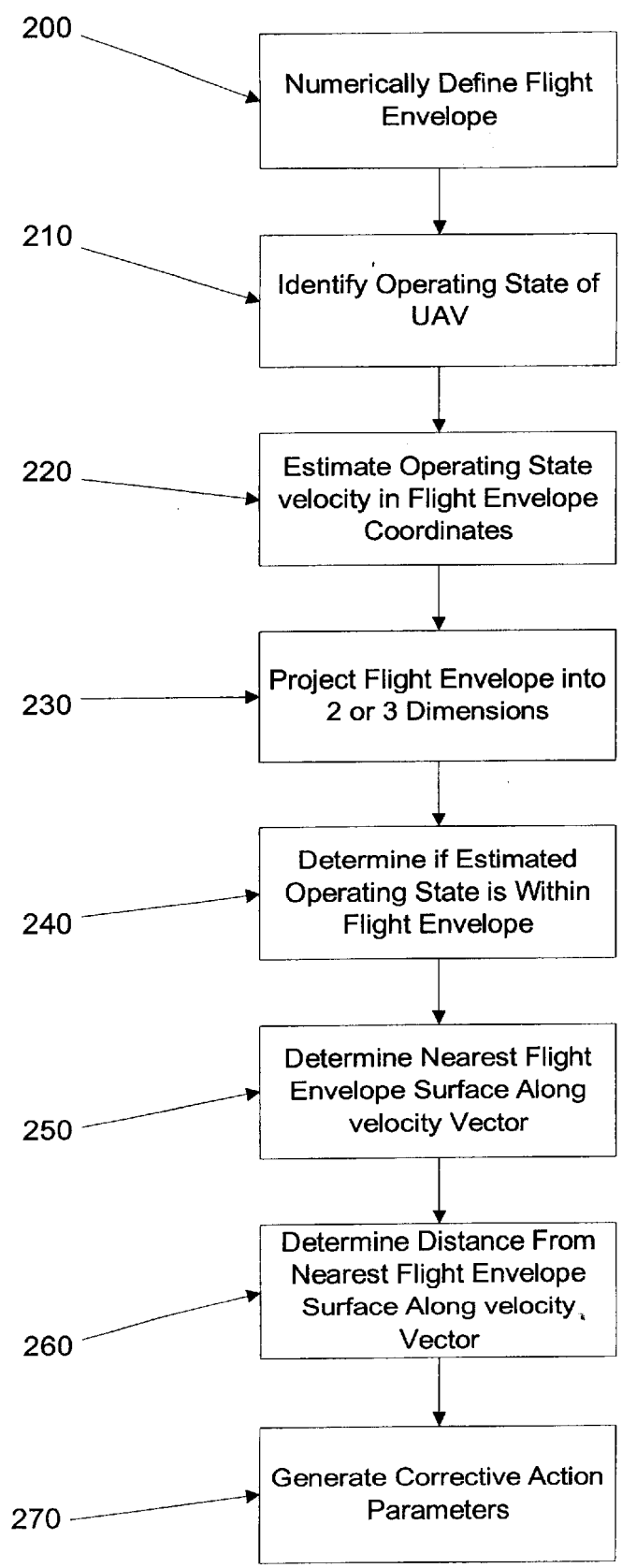
FIG. 3 illustrates a logical representation of the steps to determine if the UAV is within its flight envelope.

Referring now to FIG. 3, the bounds of the flight envelope are defined in step 200. As a first representation of the flight envelope, Velocity v. Vertical (Normal) Load ("V-N") and Velocity v. Height (altitude) ("V-H") curves, readily available from the aircraft's wind-tunnel design testing are triangulated. Triangulation in this context entails dividing any non-triangular polygonal faces of the flight envelope into triangles by adding diagonals connecting certain non-adjacent points on the curve. See O'Rourke, "Computational Geometry in C", $2^{nd}$ Ed., (Cambridge University Press, 1998), Ch. 1, hereby incorporated by reference.

O'Rourke's triangulation code is limited to polygons that are "two-dimensional" and thus is not directly applicable to (necessarily) planar polygons that have an arbitrary orientation in three-dimensional space. However, we project such polygons down to two-dimensions in a way that their polygonal structure is preserved (i.e., vertices or edges do not collapse upon one another), it is apparent that the triangulation of the projected two-dimensional polygon is naturally related to the triangulation of the original three-dimensional polygon—since the diagonals are still diagonals when so projected.

The present invention is not limited to this particular method, however. Any proper interior triangulation of the flight envelope is suitable, however derived. Triangular faces, i.e., a polyhedron, are a requisite of the routine that implements the determination of whether the UAV is within the flight envelope.

Triangulation may be done in 2-D for simple calculations, based on the readily available flight envelope data. For more demanding situations, V-N and V-H curves may be projected with reference to their common V axis into three dimensions. In the case of V-N and V-H curves, the flight envelope is projected onto a subspace of the full n-dimensional flight envelope by assuming that over the next time step, lateral motion will be small and that it can either be approximated by a constant value or by zero. The projection of the flight envelope onto a lower dimensional subspace is always evaluated at the present operating point of the aircraft. The flight envelope limits in the other dimensions are tested using the less accurate "block" approximations, the simplest of which is a simple limit test (single block) on the remaining operating point variables (the limits, in general, depend on the operating condition—in particular when the aircraft is undergoing steady maneuvers such as a coordinated turn, roll, or pull-up). In this case, n is any number of the twelve (12) Position and/or Velocity dimensions of the UAV. Specifically, the twelve dimension are: the Position of the UAV in three (3) dimensions, e.g. latitude, longitude and altitude; the rotation Position of the UAV around its own three (3) axes, i.e., lateral, longitudinal and vertical; and the Velocity (or rotation rate) of the UAV with respect to any of the six (6) above dimensions. By this technique, the limits of the flight envelope are established. Position and Velocity are capitalized intentionally in this context.

The triangulated flight envelope data and/or the block approximations of the higher dimensions of the flight envelope will define the flight envelope as an interconnected series of points, lines, and surfaces in the n-dimensional flight envelope space (n-space). Generally, the envelope will be some non-convex polytope. The present invention applies recent advances in the field of computational geometry to evaluate whether an operational point of a UAV is within the flight envelope.

Again referring to FIG. 3, at each sample time during the execution of the UAV mission, the present invention determines the present operating state of the UAV, step 210. The operating state of the UAV is the measure of the UAV in the dimensions that define the flight envelope. This may be accomplished by direct sensor measurement of pertinent flight data, approximation, or in some cases derivation from measured and/or approximated values. The data may be scaled in either vehicle-centered or global coordinates, and transformed between either coordinate system and flight envelope coordinates as necessary. The state information gives both the 'position' and 'velocity' of the current UAV operating point in n-space. 'Position' and 'velocity' are enclosed in single quotes to distinguish their discussion relative to n-space from physical Position and Velocity of the UAV in vehicle-centered or global coordinates as discussed above. For the remainder of this disclosure, position and velocity will refer to n-space unless capitalized.

The UAV operating state information gives both a coordinate position and velocity of the operating point in n-space. Therefore, information is available not only at the sample time, but also can be estimated for some future elapsed time, step 220. In an exemplary embodiment, this elapsed time is equal to the sample period of the AFEP unit 10. Therefore, even if it is determined that the UAV is within the flight envelope at the sample time, but will likely exceed the flight envelope before the subsequent sample period, corrective action will be initiated. Conversely, if a momentary excursion or phenomena, e.g., a wind gust, takes the UAV outside its flight envelope at the sample time, however the velocity of its operating point indicates it will be within the flight envelope before the subsequent sample period, then intervention may be deemed unnecessary.

The AFEP unit 10 (FIG. 1) is designed to protect the UAV for a middle range of time scales (and disturbance phenomena) that are slower than the inner loop time constants, i.e., the primary flight control system sampling period of the vehicle, but faster than mission planning time scales. Depending on the particular vehicle, and the design of these subsystems, this middle range may vary between about 0.5 seconds to about 1 minute. In the case of longer time scales, it is common that the mission management system 40 has been made aware that the flight envelope limit has been approached or exceeded, and will produce a new mission plan at the next waypoint. If this is not the case, the AFEP unit 10 will constrain the UAV within it flight envelope and the UAV will approximate its planned mission as nearly as possible.

Before the operating state of the UAV is evaluated to determine if it is within the flight envelope, the flight envelope may be collapsed in one or more dimensions, step 230. This may be done for one of several reasons. First, for ease of visualization in a UAV's design and testing phases, as most people cannot visualize the envelope in more than three dimensions. Further, many operating states of the UAV will pose no threat to breach certain surfaces of the flight envelope, therefore the calculations may be simplified by collapsing an unnecessary dimension, much like the assumptions made is drawing the V-H or V-N curves.

To determine if an operating point is within the flight envelope, step 240, the present invention makes use of a modification of routines found in "Computational Geometry in C", $2^{nd}$ Ed., by Joseph O'Rourke (Cambridge University Press, 1998), chapter 7 of which is hereby incorporated by reference for all purposes. O'Rourke provides code for determining if a point is within a polygon or polyhedron (both generally non-convex), called InPoly and InHedron, respectively. However, O'Rourke does not deal with the velocity aspects necessary to UAV implementation.

The InPoly routine functions in two dimensions by drawing a ray from the supplied test point, q. It then translates the defined polygon, P, so that q is at the origin and chooses the ray so that it is aligned with the positive x-axis. By testing for the number of intersections between the ray and P, InPoly can determine if q is inside or outside P, or lies at on an edge or a vertex.

The InPoly routine further calculates the point of intersection with each edge that straddles the ray, though it does not make any use of the value of this point of intersection. However, for the purposes of UAV control, this information is very valuable. By capturing this information in the modified InPoly routine, it is possible to determine if the operating point will cross the flight envelope boundary within a given time. Thus, the modified InPoly routine not only makes the AFEP unit 10 aware of the current operating state of the UAV, step 240, but the AFEP unit 10 is also aware of the nearest flight envelope boundary, step 250, and the distance from it, step 260. AFEP unit 10 is therefore fully capable of determining whether a departure from the envelope is imminent. This output data is required for subsequent steps of Flight Envelope Protection (FIG. 2, Step 140, 150).

The ray used by InPoly does not have to be in the direction of the positive x-axis, but can be generally in any direction. Since any ray is suitable for the purposes of the routine, the test ray is specifically chosen to be co-linear with the velocity of the operating point. This required the modified InPoly routine to perform a rotation of P to align the velocity vector as the primary direction of interest with the positive x-axis.

For more complex circumstances, or corners of the flight envelope, additional dimensions must be considered. The InHedron routine is a starting point to evaluate such situations. The InHedron routine begins by constructing a bounding box about the polyhedron, so that it can quickly classify tests points that lie outside that box as being "outside" points. This is for reasons of computational efficiency. However, this is not strictly desirable for the purposes of the present invention, because even if the operating point is outside the envelope, further processing to determine the closest face, and distance to the closest face in the direction of the velocity is useful.

The unmodified InHedron routine selects a random ray beginning at the specified operating point. The ray is of sufficient length to ensure penetration beyond the polyhedron if in fact the operating point is within the polyhedron. InHedron then compares this ray to each face of the polyhedron, and if the routine returns an odd number of ray-face intersections, then the point is judged within the polyhedron. Note zero is an even number for this determination.

Cases where the ray lies in a plane of the polyhedron, or intersects an edge or vertex of the polyhedron are also returned. Although these are considered degeneracies to the standard routine, and another ray is selected, they become relevant to the modified InHedron routine.

The modified InHedron routine will now be described. In contrast to the InPoly routine, InHedron does not translate the operating point to the origin. This somewhat simplifies the modifications. The velocity vector of the operating point is provided to the modified routine, which becomes the basis of the test ray that the modified InHedron compares to each face of the flight envelope. Thus, the modified InHedron routine bypasses the random ray generation step.

A subroutine of the InHedron routine returns the point of intersection between the test ray and any face of the polyhedron that the ray intersects. In the modified InHedron, this information is kept in a running minimum comparison to determine the closest plane to the operating state of the UAV, step 250, and the distance from it in the direction of the velocity, step 260.

In an exemplary embodiment of the present invention, The InHedron routine is run twice. First, it is run in its original version to determine if the operating point is inside, outside, or on one of the boundaries of the flight envelope. The modified InHedron is run the second time, including considerations of the velocity of the operating point.

When the first run of the InHedron routine returns the result that the operating point is within the flight envelope, then the modified InHedron routine, using the velocity vector as the basis for the test ray, can determine the distance from the nearest face in the direction of the velocity. Performing a test of the magnitude of the velocity vector for intersection with the nearest face will be straightforward to those skilled in the art.

When the first run of the InHedron routine returns the result that the operating point is outside the flight envelope, then the ray chosen in the run of the modified InHedron is still based on the velocity vector, but is made longer to determine if the UAV will eventually return to a point within the flight envelope in its current configuration. Cases where the modified InHedron routine indicates intersection with the polyhedron at an edge or a vertex are not particularly troubling. These only indicate that the UAV is expected to cross the envelope at an extreme location.

Whether using the modified InPoly or modified InHedron routines according to the present invention, the information obtained regarding the nearest boundary, step 250, and distance from it, step 260, can be used to generate the parameters of corrective action, step 270, commended by the AFEP unit 10. As described, supra, this corrective action can entail limitation of the UAV's progress in a given direction, in the case where the operating state of the UAV is presently within the flight envelope but predicted to exceed the envelope imminently. Alternately, in the case where the operating state of the UAV is determined to be outside the flight envelope, and not predicted to return in the direction of its present velocity, the distance from the nearest face along the reverse direction of the velocity can indicate proper corrective action to return the UAV operating state to the flight envelope in a minimum time.

The invention has been described herein with reference to particular exemplary embodiments. Certain alterations and modifications may be apparent to those skilled in the art, without departing from the scope of the invention. For example, a preferred embodiment using computational geometry techniques is described. It is also within the scope of the invention to use such techniques as polytope approximation, or projection. The exemplary embodiments are not meant to be limiting on the scope of the invention, which is defined by the appended claims.

What is claimed is:

1. A method of detecting if a UAV is operating within its flight envelope, the method comprising:
   (a) define the flight envelope of the UAV;
   (b) identify the operating state of the UAV from a present time to a future elapsed time; and
   (c) determine if the operating state of the UAV will be within the flight envelope at the end of the elapsed time in the future.

2. The method according to claim 1, wherein step (a) comprises:
   (i) define the flight envelope as an n-dimensional polytope, where n is at least one of twelve (12) Position or Velocity dimensions of the UAV.

3. The method according to claim 1, wherein step (b) comprises:
   (i) measure or approximate the Position or Velocity of the UAV; and
   (ii) transform the Position or Velocity of step (i) into the coordinate system of the flight envelope.

4. The method according to claim 1, wherein step (c) comprises performing a computational geometric calculation.

5. The method according to claim 4, wherein the flight envelope is projected onto no more than three dimensions before the computational geometric calculation is performed.

6. The method according to claim 4, wherein the flight envelope is projected onto no more than two dimensions before the computational geometric calculation is performed.

7. The method according to claim 4, step (c) further comprises determining the nearest boundary of the flight envelope to the operating state of the UAV.

8. The method according to claim 4, wherein step (c) further comprises determining the distance in flight envelope coordinates between the operating state of the UAV and the nearest boundary of the flight envelope.

9. The method according to claim 1, wherein the elapsed time in the future is greater than an inner loop time constant of a UAV control system.

10. The method according to claim 1, wherein the elapsed time in the future is shorter than a UAV mission planning time scale.

11. A system for detecting if a UAV is operating within its flight envelope, the system comprising:
    means for defining the flight envelope of the UAV;
    means for identifying the operating state of the UAV from a present time to a future elapsed time;
    means for determining if the UAV will be within its flight envelope at the end of the elapsed time in the future.

12. The system according to claim 11, wherein means for determining if the UAV will be within its flight envelope at the end of the elapsed time in the future comprises means for performing a computational geometric calculation.

13. The system according to claim 11, wherein means for determining if the UAV will be within its flight envelope at the end of the elapsed time in the future comprises means for determining the nearest boundary of the flight envelope to the operating state of the UAV.

14. The system according to claim 11, wherein means for determining if the UAV will be within its flight envelope at the end of the elapsed time in the future comprises means for determining the distance in flight envelope coordinates between the operating state of the UAV and the nearest boundary of the flight envelope.

15. A method of automatic flight envelope protection in a UAV, the method comprising:
    (a) define the flight envelope of the UAV;
    (b) identify the operating state of the UAV from a present time to a future elapsed time;
    (c) determine if the operating state of the UAV will be within the flight envelope at the end of the elapsed time in the future; and
    (d) if the operating state determined in step (c) is outside the flight envelope, then command the UAV to maintain operation within the flight envelope.

16. The method according to claim 15, wherein step (c) comprises performing a computational geometric calculation.

17. The method according to claim 16, wherein step (c) further comprises determining the distance in flight envelope coordinates between the operating state of the UAV and the nearest boundary of the flight envelope.

18. The method of claim 17, wherein step (c) further comprises comparing the velocity of the operating state of the UAV to the distance from the nearest boundary.

19. The method according to claim 15, wherein step (d) further comprises limiting the progress of the UAV in at least one dimension of Position or Velocity.

20. The method according to claim 15, further comprising:
    (e) determine if the velocity of the operating state of the UAV will intersect the flight envelope; and
    (f) if it is determined in step (e) that the velocity of the operating state will not intersect the flight envelope, then step (d) further comprises commanding the UAV to operate so as to reverse the direction of the velocity of the operating state.

* * * * *